US006734792B1

(12) United States Patent
McElveen

(10) Patent No.: US 6,734,792 B1
(45) Date of Patent: May 11, 2004

(54) HITCH-MOUNTED WARNING SIGN APPARATUS FOR A VEHICLE

(76) Inventor: James E. McElveen, 944 Deer Run Dr., Hartsville, SC (US) 29550

( * ) Notice: Subject to any disclaimer, the term of this patent is extended or adjusted under 35 U.S.C. 154(b) by 0 days.

(21) Appl. No.: 10/308,270

(22) Filed: Dec. 4, 2002

(51) Int. Cl.⁷ .............................. B60Q 1/26; G09F 21/04
(52) U.S. Cl. ....................... 340/468; 340/431; 340/321; 340/472; 362/485; 40/590; 40/606.01
(58) Field of Search ................. 340/468, 431, 340/321, 472; 280/504, 507; 248/542; 362/459, 485; 40/590, 584, 606.01

(56) References Cited

U.S. PATENT DOCUMENTS

| 4,800,471 A | * | 1/1989 | Lippert ......................... 362/80 |
| 5,198,798 A | | 3/1993 | Lietzow et al. ............. 340/468 |
| 5,603,178 A | | 2/1997 | Morrison ...................... 40/591 |
| D383,080 S | | 9/1997 | Derrick ...................... D10/109 |
| 5,979,094 A | | 11/1999 | Brafford, Jr. ................. 40/590 |
| 6,007,033 A | * | 12/1999 | Casson et al. ............ 248/224.7 |
| 6,053,627 A | * | 4/2000 | Vo et al. ...................... 362/497 |
| 6,079,136 A | | 6/2000 | Kozlarek ...................... 40/541 |
| 6,140,919 A | | 10/2000 | Buchanan ................... 340/468 |
| 6,357,899 B1 | * | 3/2002 | Craven ....................... 362/485 |

* cited by examiner

Primary Examiner—Donnie L. Crosland

(57) ABSTRACT

A hitch-mounted warning sign apparatus for a vehicle for alerting approaching motorists of road work being conducted in the area. The hitch-mounted warning sign apparatus for a vehicle includes a receiver hitch being adapted to be mounted to a vehicle and including a tubular member having an open end, a bore extending therein through the open end, and a hole being disposed through a side wall of the tubular member; and also includes a sign support assembly being fastenably mounted to the receiver hitch; and further includes a fastener being removably extended through the hole of the receiver hitch for fastening the sign support assembly to the receiver hitch; and also includes a light-emitting assembly being attached to the sign support assembly; and further includes a sign assembly being mounted to the sign support assembly.

7 Claims, 3 Drawing Sheets

HITCH-MOUNTED WARNING SIGN APPARATUS FOR A VEHICLE

BACKGROUND OF THE INVENTION

1. Field of the Invention

The present invention relates to vehicle-mounted warning signs and more particularly pertains to a new hitch-mounted warning sign apparatus for a vehicle for alerting approaching motorists of road work being conducted in the area.

2. Description of the Prior Art

The use of vehicle-mounted warning signs is known in the prior art. More specifically, vehicle-mounted warning signs heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,979,094; 5,198,798; 6,079,126; 6,140,919; 5,603,178; and U.S. Pat. No. Des. 383,080.

While these devices fulfill their respective, particular objectives and requirements, the aforementioned patents do not disclose a new hitch-mounted warning sign apparatus for a vehicle. The prior art frames and signs which are attached to the vehicles for displaying particular messages.

SUMMARY OF THE INVENTION

The general purpose of the present invention, which will be described subsequently in greater detail, is to provide a new hitch-mounted warning sign apparatus for a vehicle which has many of the advantages of the vehicle-mounted warning signs mentioned heretofore and many novel features that result in a new hitch-mounted warning sign apparatus for a vehicle which is not anticipated, rendered obvious, suggested, or even implied by any of the prior art vehicle-mounted warning signs, either alone or in any combination thereof. The present invention includes a receiver hitch being adapted to be mounted to a vehicle and including a tubular member having an open end, a bore extending therein through the open end, and a hole being disposed through a side wall of the tubular member; and also includes a sign support assembly being fastenably mounted to the receiver hitch; and further includes a fastener being removably extended through the hole of the receiver hitch for fastening the sign support assembly to the receiver hitch; and also includes a light-emitting assembly being attached to the sign support assembly; and further includes a sign assembly being mounted to the sign support assembly. None of the prior art includes the combination of the elements of the present invention.

There has thus been outlined, rather broadly, the more important features of the hitch-mounted warning sign apparatus for a vehicle in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new hitch-mounted warning sign apparatus for a vehicle which has many of the advantages of the vehicle-mounted warning signs mentioned heretofore and many novel features that result in a new hitch-mounted warning sign apparatus for a vehicle which is not anticipated, rendered obvious, suggested, or even implied by any of the prior art vehicle-mounted warning signs, either alone or in any combination thereof.

Still another object of the present invention is to provide a new hitch-mounted warning sign apparatus for a vehicle for alerting approaching motorists of road work being conducted in the area.

Still yet another object of the present invention is to provide a new hitch-mounted warning sign apparatus for a vehicle that is easy and convenient to set up and use.

Even still another object of the present invention is to provide a new hitch-mounted warning sign apparatus for a vehicle that provides safety for workers working nearby.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
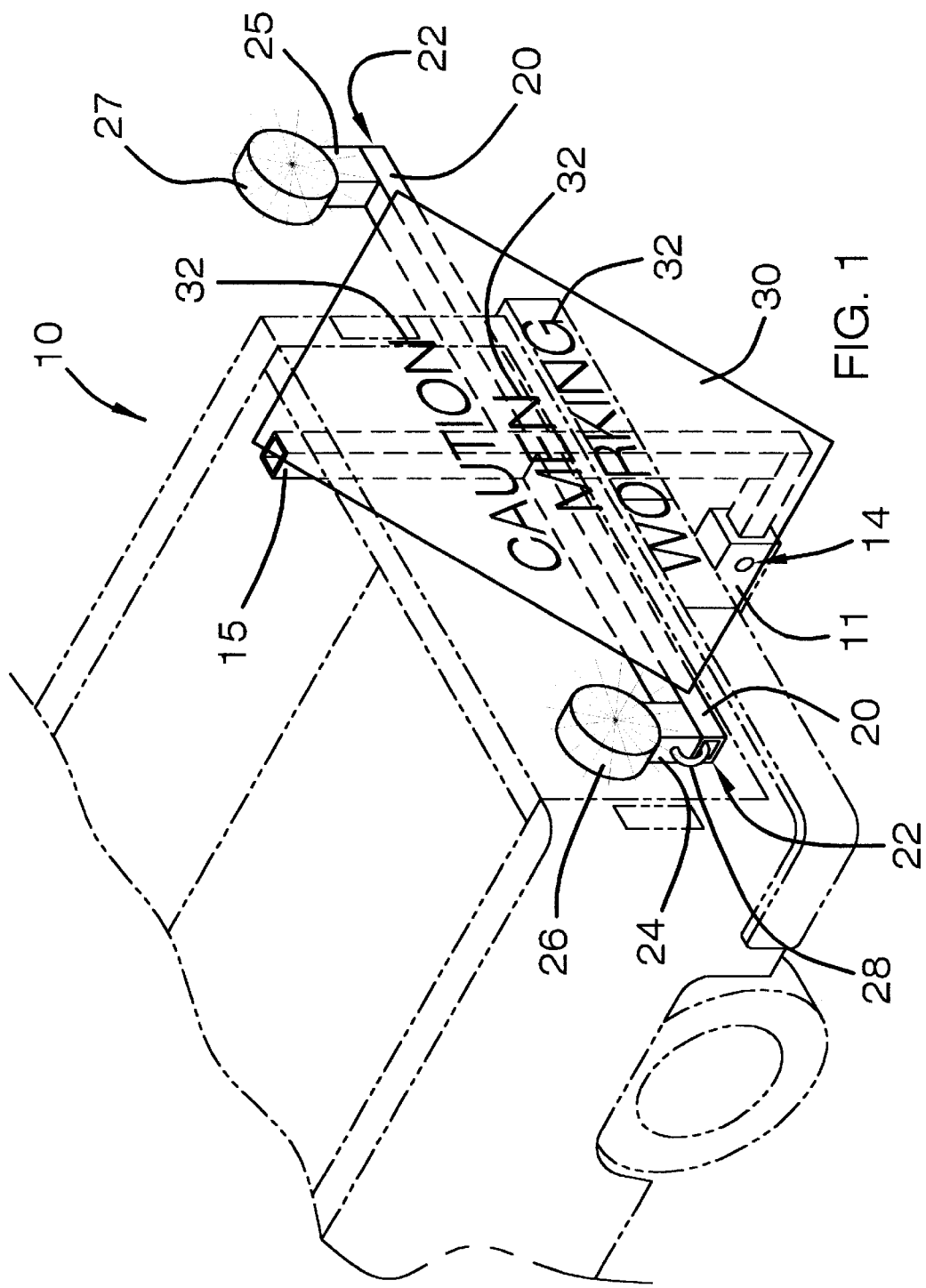
FIG. 1 is a perspective view of a new hitch-mounted warning sign apparatus for a vehicle according to the present invention.
Figure 2:
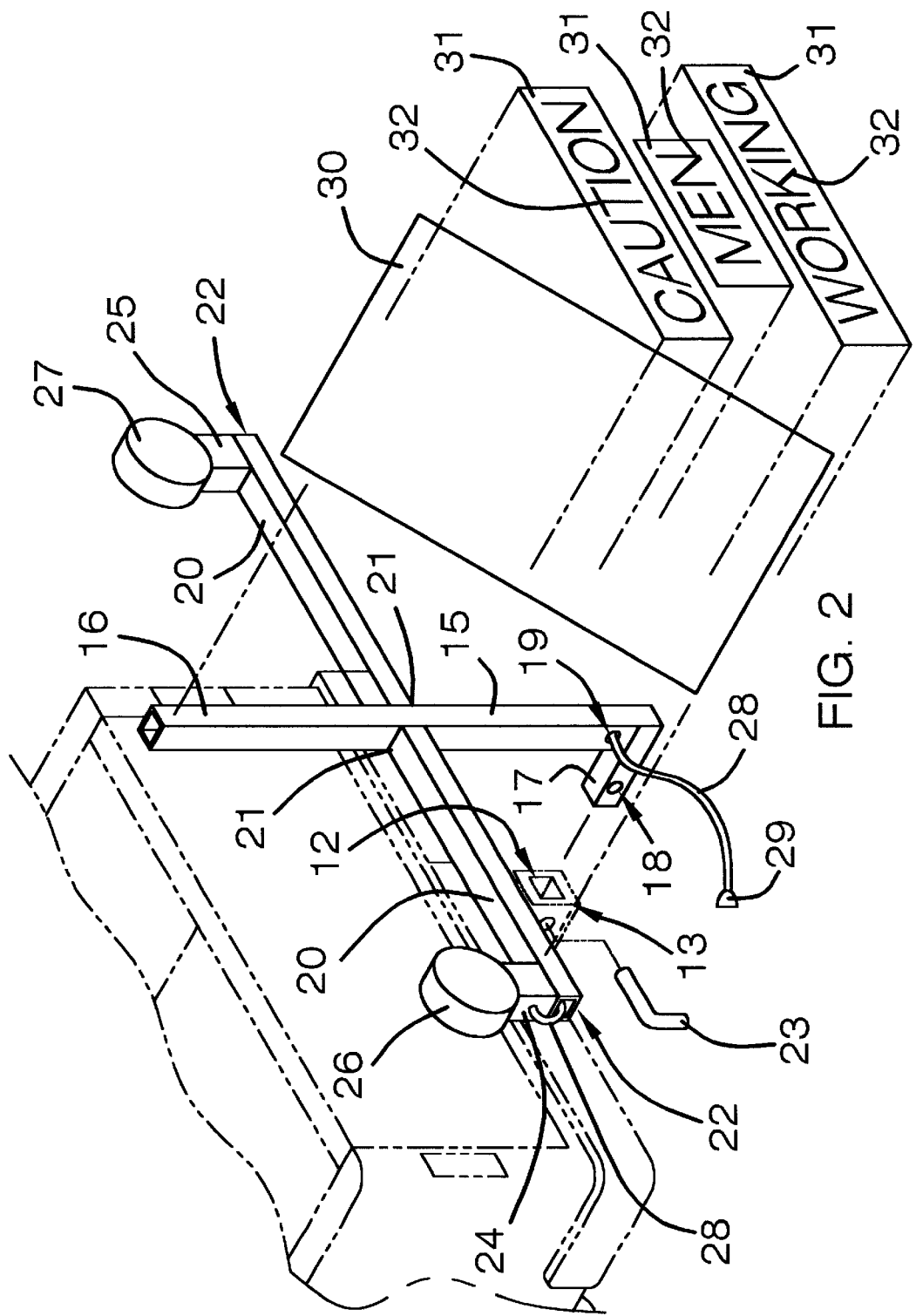
FIG. 2 is an exploded perspective view of the present invention.
Figure 3:
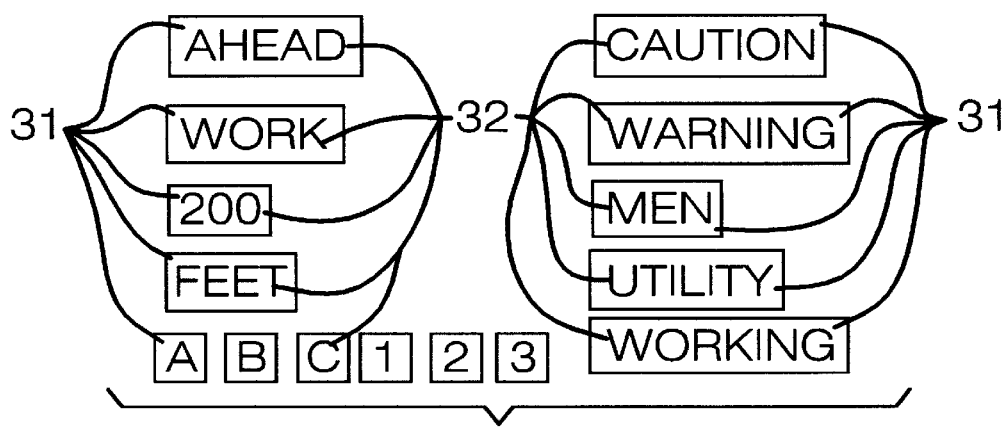
FIG. 3 is a front elevational view of indicia of the present invention.
Figure 4:
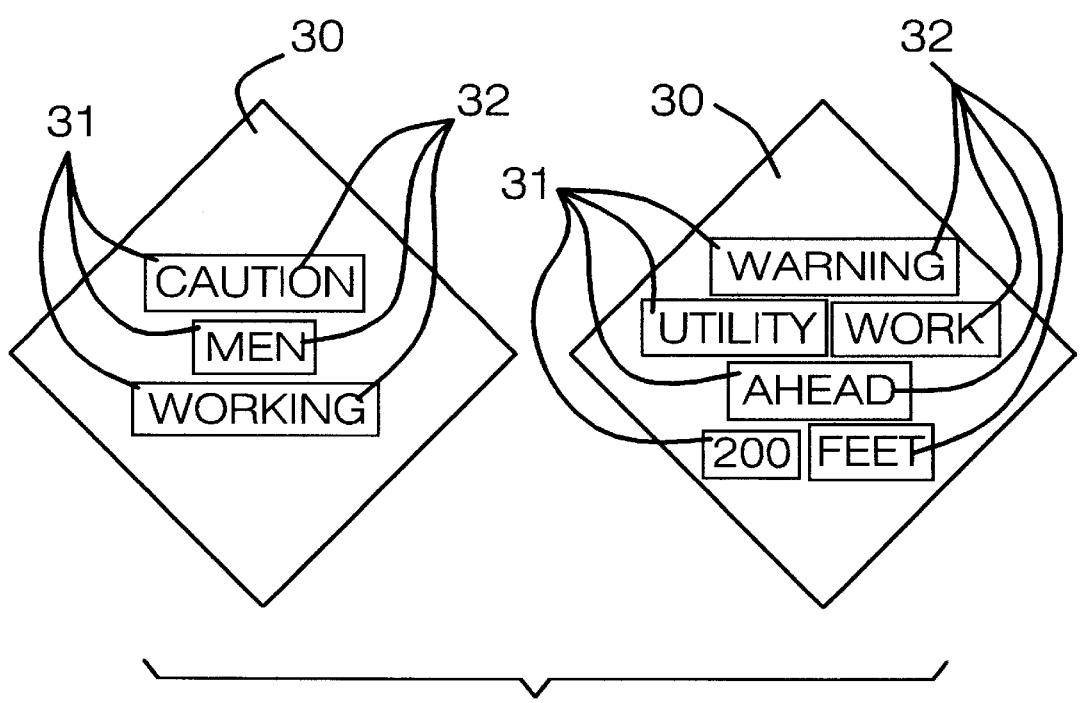
FIG. 4 is a front elevational view of the sign assembly of the present invention.

With reference now to the drawings, and in particular to FIGS. 1 through 4 thereof, a new hitch-mounted warning sign apparatus for a vehicle embodying the principles and concepts of the present invention and generally designated by the reference numeral 10 will be described.

As best illustrated in FIGS. 1 through 4, the hitch-mounted warning sign apparatus for a vehicle 10 generally comprises a receiver hitch being adapted to be mounted to a vehicle and including a tubular member 11 having an open end 12, a bore 13 extending therein through the open end 12, and a hole 14 being disposed through a side wall of the tubular member 11.

A sign support assembly is fastenably mounted to the receiver hitch. The sign support assembly includes an elongate tubular support member 15 having an end portion 17 which is fastenably received through the open end 12 of the hitch receiver; and also includes elongate tubular branch members 20 being conventionally attached and welded to the elongate tubular support member 15 and extending outwardly therefrom. The elongate tubular support member 15 has an elongate main portion 16 which is vertically erected upon the elongate tubular support member 15 being fastened to the receiver hitch with the end portion 17 being angled generally perpendicular to the elongate main portion 16. The elongate tubular support member 15 also has a hole 18 being disposed through a side wall of the end portion 17 thereof. The elongate tubular branch members 20 have first ends 21 which are opposedly attached to the elongate tubular support member 15 and extend outwardly generally perpendicular to the elongate tubular support member 15 and in opposite directions to one another.

A fastener 23 is removably extended through the hole 14 of the receiver hitch for fastening the sign support assembly to the receiver hitch. The fastener 23 is a pin which is removably received in the holes 14,18 of the receiver hitch and the end portion 17 of the elongate tubular support member 15.

A light-emitting assembly is conventionally attached to the sign support assembly. The light-emitting assembly includes light-emitting support/connector members 24,25 being securely and conventionally mounted to the elongate tubular branch members 20 at open second ends 22 thereof, and also includes light-emitting members 26,27 being securely and conventionally attached to the light-emitting support/connector members 24,25, and further include a power cord 28 having a plug 29 and being conventionally attached to the light-emitting members 26,27 and being disposed through the open second ends 22 of the elongate tubular branch members 20 and through the elongate tubular support member 15 and through a hole 19 in the elongate main portion 16 of the elongate tubular support member 15.

A sign assembly is conventionally mounted to the sign support assembly. The sign assembly includes a diamond-shaped panel 30 being conventionally attached to the elongate tubular support member 15 and the elongate tubular branch members 20 and having a front side, and also includes sign members 31 being removably arranged upon the diamond-shaped panel 30 for displaying warning messages to approaching motorists. The diamond-shaped panel 30 is made of metallic material. The sign members 30 include pieces of magnetic material which are removably and conventionally attached upon the front side of the diamond-shaped panel 30, and include indicia 32 conventionally imprinted upon the pieces of magnetic material and being arranged to form words formulating warning messages to approaching motorists.

In use, the user mounts the end portion 17 of the elongate tubular support member 15 in the bore 13 of the receiver hitch with the diamond-shaped panel 30 being vertically disposed and with the sign members 31 being displayed outwardly away from the vehicle and being highly visible to approaching motorists, and also connects the power cord 28 to a power source of the vehicle such as the battery of the vehicle to energize the light-emitting members 26,27. The hitch-mounted sign apparatus for a vehicle 10 alerts the approaching motorists of a worker or workers nearby.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the hitch-mounted warning sign apparatus for a vehicle. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hitch-mounted warning sign apparatus for a vehicle, comprising:

a receiver hitch being adapted to be mounted to a vehicle and including a tubular member having an open end, a bore extending therein through said open end, and a hole being disposed through a side wall of said tubular member;

a sign support assembly being fastenably mounted to said receiver hitch, said sign support assembly including an elongate tubular support member having an end portion which is fastenably received through said open end of said hitch receiver; and also including elongate tubular branch members being attached to said elongate tubular support member and extending outwardly therefrom, said elongate tubular support member having an elongate main portion which is vertically erected upon said elongate tubular support member being fastened to said receiver hitch with said end portion being angled generally perpendicular to said elongate main portion, said elongate tubular support member also having a hole being disposed through a side wall of said end portion thereof;

a fastener being removably extended through said hole of said receiver hitch for fastening said sign support assembly to said receiver hitch;

a light-emitting assembly being attached to said sign support assembly; and a sign assembly being mounted to said sign support assembly.

2. A hitch-mounted warning sign apparatus for a vehicle as described in claim 1, wherein said elongate tubular branch members have first ends which are opposedly attached to said elongate tubular support member and extend outwardly generally perpendicular to said elongate tubular support member and in opposite directions to one another.

3. A hitch-mounted warning sign apparatus for a vehicle as described in claim 2, wherein said fastener is a pin which is removably received in said holes of said receiver hitch and said end portion of said elongate tubular support member.

4. A hitch-mounted warning sign apparatus for a vehicle as described in claim 3, wherein said light-emitting assembly includes light-emitting support/connector members being securely mounted to said elongate tubular branch member at open second ends thereof, and also includes light-emitting members being securely attached to said light-emitting support/connector members, and further include a power cord having a plug and being attached to said light-emitting members and being disposed through said open second ends of said elongate tubular branch members and through said elongate tubular support member and through a hole in said elongate main portion of said elongate tubular support member.

5. A hitch-mounted warning sign apparatus for a vehicle as described in claim 4, wherein said sign assembly includes a diamond-shaped panel being attached to said elongate tubular support member and said elongate tubular branch members and having a front side, and also includes sign members being removably arranged upon said diamond-shaped panel for displaying warning messages to approaching motorists.

6. A hitch-mounted warning sign apparatus for a vehicle as described in claim 5, wherein said diamond-shaped panel is made of metallic material.

7. A hitch-mounted warning sign apparatus for a vehicle as described in claim 6, wherein said sign members include pieces of magnetic material which are removably attached upon said front side of said diamond-shaped panel, and include indicia imprinted upon said pieces of magnetic material and being arranged to form words formulating warning messages to approaching motorists.

\* \* \* \* \*